(12) United States Patent
Ha et al.

(10) Patent No.: US 7,438,871 B2
(45) Date of Patent: Oct. 21, 2008

(54) CATALYTIC OXIDATION REACTOR WITH ENHANCED HEAT EXCHANGING SYSTEM

(75) Inventors: Kyoung-Su Ha, Daejeon (KR); Geon-Yong Kim, Seoul (KR); Seong-Pil Kang, Daejeon (KR); Boo-Gon Woo, Daejeon (KR)

(73) Assignee: LG Chem, Ltd. (KR)

( * ) Notice: Subject to any disclaimer, the term of this patent is extended or adjusted under 35 U.S.C. 154(b) by 736 days.

(21) Appl. No.: 10/490,888

(22) PCT Filed: Nov. 8, 2002

(86) PCT No.: PCT/KR02/02074

§ 371 (c)(1),
(2), (4) Date: Mar. 25, 2004

(87) PCT Pub. No.: WO2004/007064

PCT Pub. Date: Jan. 22, 2004

(65) Prior Publication Data

US 2004/0213711 A1    Oct. 28, 2004

(30) Foreign Application Priority Data

Jul. 10, 2002    (KR) .................... 10-2002-0040043

(51) Int. Cl.
*B01J 19/00*    (2006.01)
*F28B 7/00*    (2006.01)
*G05D 7/00*    (2006.01)

(52) U.S. Cl. .................... 422/198; 422/109; 422/201

(58) Field of Classification Search ............... 422/198, 422/201, 109
See application file for complete search history.

(56) References Cited

U.S. PATENT DOCUMENTS 3,147,084 A    9/1964    Franzen et al. ............. 23/288
3,290,894 A *  12/1966   Utah ......................... 62/216

(Continued)

FOREIGN PATENT DOCUMENTS

DE    198 57 842 A1    6/2000

(Continued)

OTHER PUBLICATIONS

PCT International Search Report; International Application No. PCT/KR02/02074; International filing date: Nov. 8, 2002; Date of Mailing: Apr. 10, 2003.

*Primary Examiner*—Alexa D. Neckel
*Assistant Examiner*—Matthew J Merkling
(74) *Attorney, Agent, or Firm*—Cantor Colburn LLP

(57) ABSTRACT

A heat exchange-type reactor includes a reaction chamber (1) having mounted therein a plurality of contact tubes (5) filled with a catalyst material; at least one shield plate (11) mounted within the reaction chamber to partition an inner space of the reaction chamber into at least two separate spaces (1*d*, 1*e*); a plurality of conduits (13, 15, 17, 19) having entrance (15*a*, 17*a*) and exit (13*a*, 17*a*) openings through which a heat transfer medium respectively enters and exits, and being mounted to an outer circumference of the reaction chamber (1) corresponding to the partitioned spaces (1*d*, 1*e*); and a heat exchange unit connected to the conduits (13, 15, 17, 19) to perform heat exchange of the heat transfer medium, in which the heat exchange unit includes a single heat exchanger that performs the exchange of heat of the heat transfer medium in accordance with the partitioned spaces.

2 Claims, 5 Drawing Sheets

U.S. PATENT DOCUMENTS

| | | | | |
|---|---|---|---|---|
| 3,482,948 A | * | 12/1969 | Miegel | 422/197 |
| 3,871,445 A | | 3/1975 | Wanka et al. | 165/107 |
| 4,256,783 A | | 3/1981 | Takada et al. | 422/197 |
| 5,695,002 A | * | 12/1997 | Tanaka et al. | 165/10 |
| 5,719,299 A | * | 2/1998 | Te Raa | 549/534 |
| 2001/0024630 A1 | | 9/2001 | Matsumoto et al. | 422/201 |
| 2003/0175183 A1 | * | 9/2003 | Guetlhuber | 422/196 |

FOREIGN PATENT DOCUMENTS

| | | |
|---|---|---|
| EP | 1 097 745 A1 | 5/2001 |
| JP | 2001129384 | 5/2001 |
| WO | 0035574 | 6/2000 |

\* cited by examiner

CATALYTIC OXIDATION REACTOR WITH ENHANCED HEAT EXCHANGING SYSTEM

BACKGROUND OF THE INVENTION (a) Field of the Invention

The present invention relates to a heat exchange-type reactor, and more particularly, to a heat exchange-type reactor used to produce acrylic acid by utilizing a catalytic oxidation reaction.

(b) Description of the Related Art

Acrylic acid is typically produced from propylene that has undergone a two-stage vapor phase catalytic oxidation reaction. In the first stage, molecular oxygen, diluted inert gas, steam, and a predetermined amount of a catalyst to oxidize propylene to thereby produce acrolein is used. In the second step, molecular oxygen, diluted inert gas, vapor, and a predetermined amount of a catalyst to oxidize acrolein is again used to thereby produce acrylic acid.

A reactor performing these processes is configured to perform both stages in a single device or to perform the two stages in two different devices. U.S. Pat. No. 4,256,783 discloses such a reactor.

In industries that use such reactors, much effort is being put forth to increase manufacturing productivity by improving the structure of the reactor, providing an optimal catalyst to bring about the oxidation reaction, or by improving the driving of the processes, etc. In this regard, a space velocity of propylene supplied to the reactor or the concentration of the propylene is increased. In either of these two cases, the oxidation reaction in the reactor abruptly occurs such that it is difficult to control the reaction temperature, and in addition, many hot spots are generated in catalyst layers of the tubular reactor such that by-products such as carbon monoxide and carbon dioxide are produced to thereby reduce the yield of the acrylic acid. Further, when producing acrylic acid that uses a high space velocity and a high concentration of propylene, the accelerated exothermic reactions cause difficulty in controlling reaction temperature. As a result, a problem with the catalyst layer occurs (e.g., a reduction in the number of active sites caused by a breakaway of effective elements and a sintering of metal elements) such that its function deteriorates.

Hence, during the manufacture of acrylic acid, controlling the heat in the reactor is the most important aspect for ensuring high productivity. In particular, it is necessary to minimize temperatures at the hot spots in the catalyst layers and heat accumulation in the vicinity of the hot spots, and to eliminate runaway of the reactor caused by the hot spots (runaway is a situation in which the heat generation reaction becomes excessive so that the reactor cannot be controlled or the reactor explodes).

To remedy such problems, U.S. Pat. No. 4,256,783 is structured such that a shield plate is mounted in a shell of a reactor that provides a plurality of tubes. The shield plate divides the space within the shell such that the temperature in the resulting separate spaces may be controlled according to different temperature distributions.

In addition to the above patent, configurations to obtain effective cooling systems are disclosed, in which molten salt circulation paths for the mounting of various baffles (e.g., U.S. Pat. No. 3,871,445), and an oxidation reactor design that combines a cooler and a heat exchanger (e.g., U.S. Pat. No. 3,147,084) are provided.

However, in such reactors, although the management of hot spots in the catalyst layers by the shield plate is more effectively realized, since a separate heat exchanger is required for each of the divided spaces in the shell, the overall structure of the device becomes more complicated.

SUMMARY OF THE INVENTION

It is one object of the present invention to provide a heat exchange-type reactor, in which the temperatures at the hot spots are effectively controlled and runaway may be avoided, and in which a structure of a heat exchanging system corresponding to divided spaces within a shell is simplified.

In one embodiment, the present invention provides a heat exchange-type reactor including a reaction chamber having mounted therein a plurality of contact tubes filled with catalyst materials; at least one shield plate mounted within the reaction chamber to partition an inner space of the reaction chamber into at least two separate spaces; a plurality of pairs of conduits having entrance and exit openings through which a heat transfer medium respectively enters and exits, and being mounted to an outer circumference of the reaction chamber corresponding to the partitioned spaces; and a heat exchange unit connected to the conduits to perform heat exchange of the heat transfer medium, wherein the heat exchange unit includes a single heat exchanger that performs the exchange of heat of the heat transfer medium in accordance with the partitioned spaces. The molten salts, silicone oils, DOWTHERMs, steam and the like may be used as the heat transfer medium.

The heat exchange unit connects the heat exchanger to one of the conduits having an exit opening, and the heat exchange unit includes a first holder connected to a conduit having an entrance opening and to another conduit having an exit opening, a steam line being connected to the first holder to heat the heat transfer medium; a second holder connected to the heat exchanger and to another conduit having an entrance opening to receive the heat transfer medium that has undergone heat exchange through the heat exchanger; and a regulating valve connected between the first holder and the second holder, the regulating valve regulating a flow rate of the heat transfer medium between the two holders.

In another aspect, the heat exchange unit includes a third holder connected to a conduit having an entrance opening and to which is connected a steam line to heat the heat transfer medium; a fourth holder connected to a conduit having an entrance opening and to which is connected a steam line to heat the heat transfer medium; a first 4-way valve connected to another conduit having an exit opening and to the heat exchanger; a second 4-way valve connected to the heat exchanger and to the third and fourth holders; and a regulating valve connected between the third holder and the fourth holder, the regulating valve regulating a flow rate of the heat transfer medium received in the fourth holder.

In particular, it is desirable that the entrance openings of the conduits are implemented closer to the shield plate than the exit openings of the conduits, and the heat transfer medium is molten salt.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
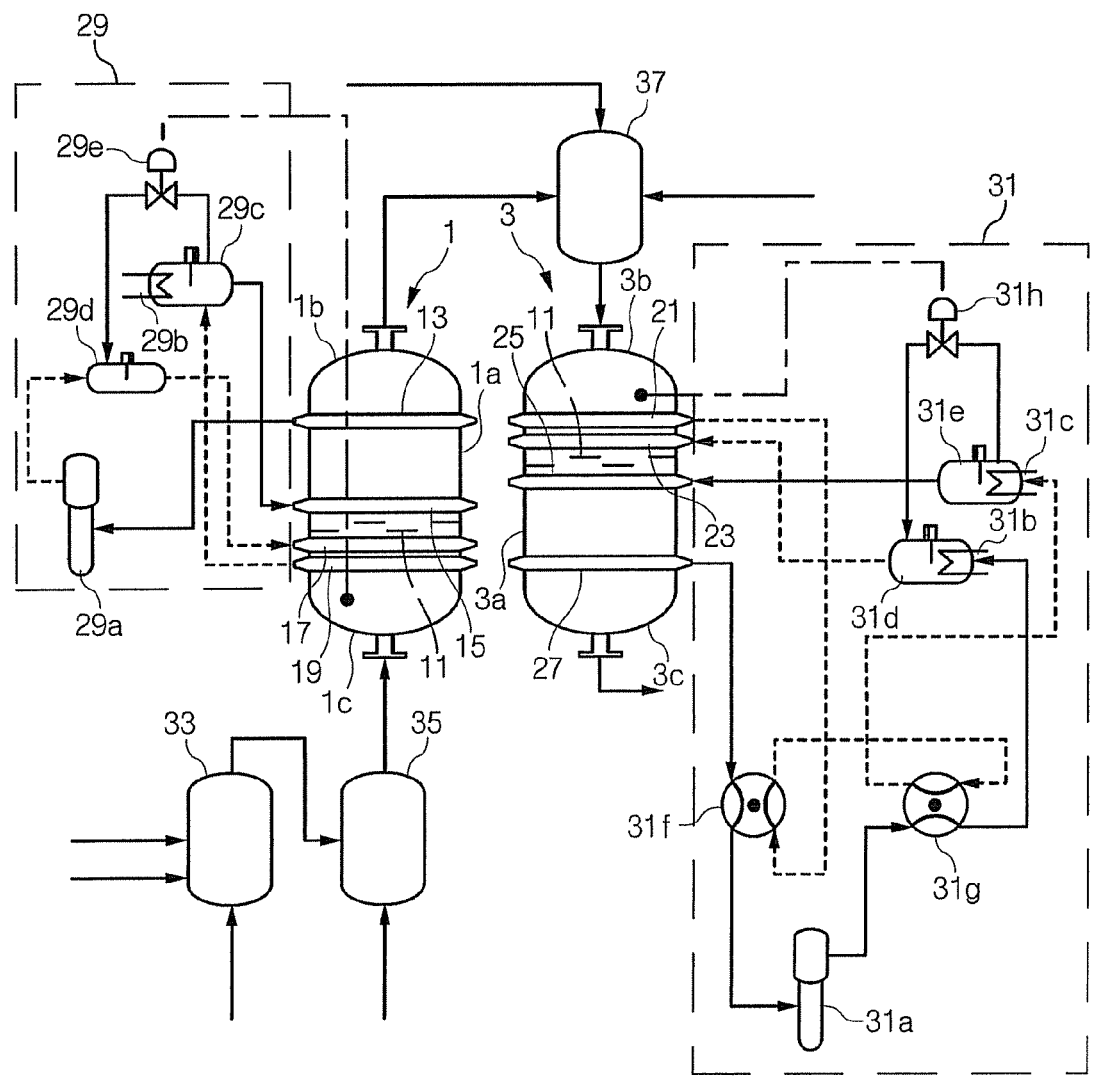
FIG. 1 is a typical view of a catalytic oxidation reactor according to a first embodiment of the present invention.
Figure 2:
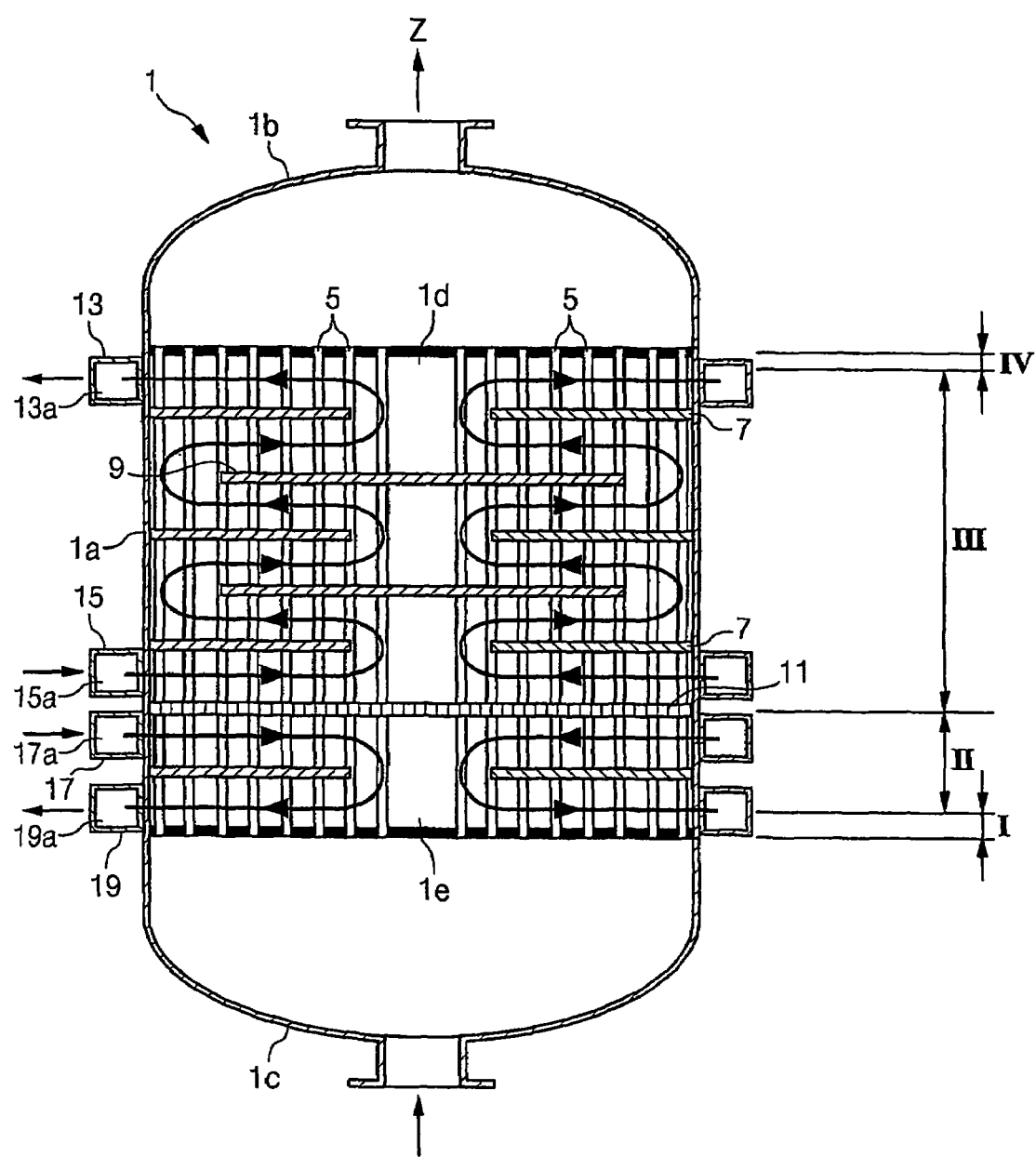
FIG. 2 is a sectional view of a first reaction chamber of the catalytic oxidation reactor of FIG. 1.
Figure 3:
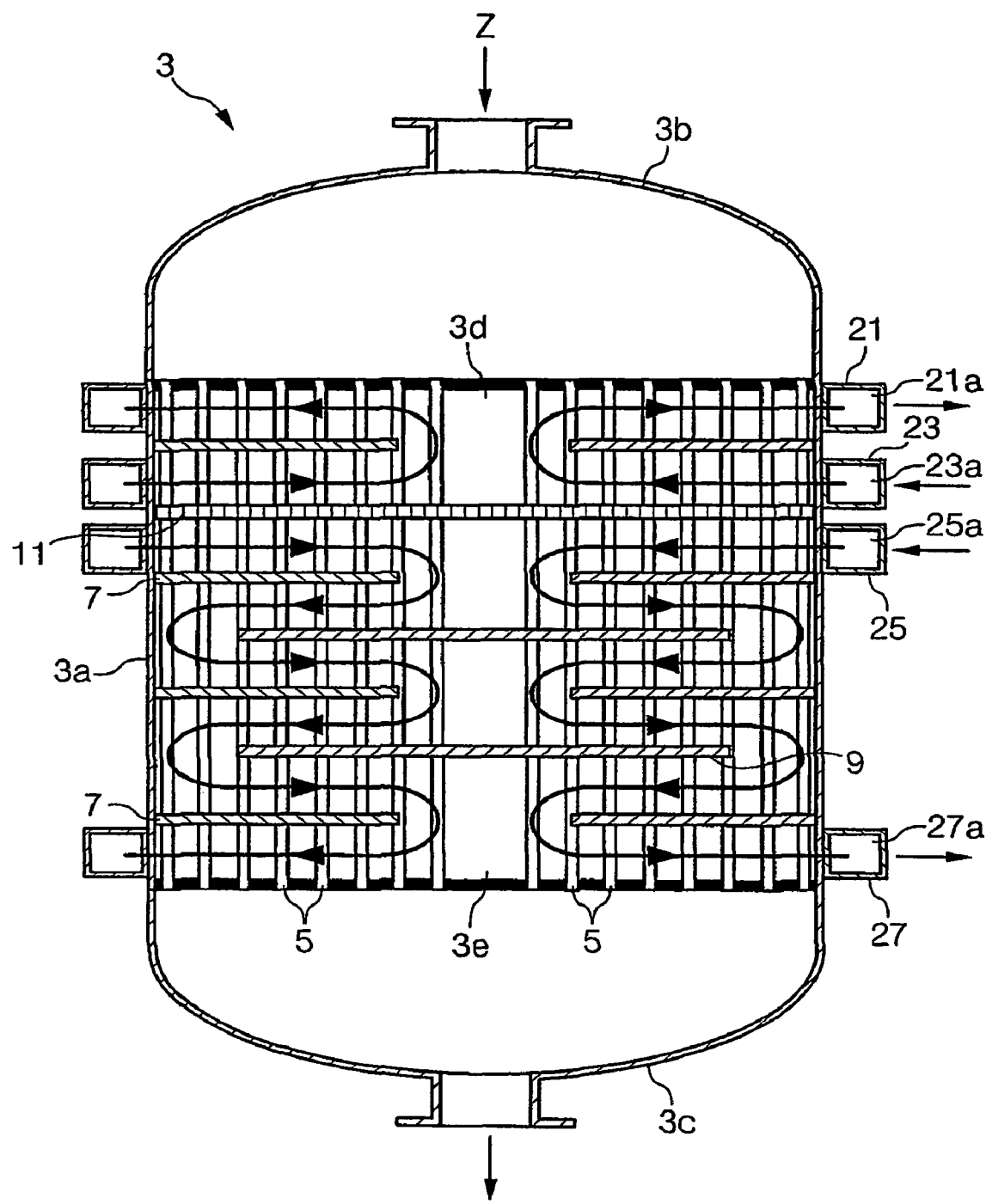
FIG. 3 is a sectional view of a second reaction chamber of the catalytic oxidation reactor of FIG. 1.

FIG. 1 is a typical view of a catalytic oxidation reactor according to a first embodiment of the present invention, and FIGS. 2 and 3 are sectional views of reaction chambers of the catalytic oxidation reactor.

The reactor is a heat exchange-type reactor used for producing acrylic acid from propylene. With reference to the drawings, the reactor according to a first embodiment of the present invention includes reaction chambers 1 and 3. That is, since acrylic acid is produced by performing an oxidation reaction in two stages in the first embodiment, the reactor includes a first reaction chamber 1 and a second reaction chamber 3 connected in series. A first oxidation reaction is performed in the first reaction chamber 1 and a second oxidation reaction is performed in the second reaction chamber 3. The first reaction chamber 1 includes a cylindrical shell $1a$ of a predetermined size that defines an inner space, and an upper cap $1b$ and a lower cap $1c$ connected to opposite ends of the shell $1a$ (i.e., to upper and lower ends of the shell $1a$ in the drawing). Similarly, the second reaction chamber 3 includes a cylindrical shell $3a$ of a predetermined size that defines an inner space, and an upper cap $3b$ and a lower cap $3c$ connected to opposite ends of the shell $3a$ (i.e., to upper and lower ends of the shell $3a$ in the drawing).

A plurality of contact tubes 5 are mounted at predetermined intervals in the first and second reaction chambers 1 and 3. The contact tubes 5 are filled with catalyst materials. Further, donut-shaped baffles 7 or disc-shaped baffles 9 are mounted in the first and second reaction chambers 1 and 3. The baffles 7 and 9 guide the flow of a heat transfer medium that is circulated within the first and second reaction chambers 1 and 3.

Also mounted in each of the first and second reaction chambers 1 and 3 is at least one shield plates 11. The shield plates 11 of the first and second reaction chambers 1 and 3 partition the spaces defined therein into at least two separate spaces. In the first preferred embodiment of the present invention, one shield plate 11 is provided in each of the first and second reaction chambers 1 and 3 to divide the spaces therein into two separate spaces, that is, spaces $1d$ and $1e$ for the first reaction chamber 1 and spaces $3d$ and $3e$ for the second reaction chamber 3.

Mounted to an outer circumference of the first reaction chamber 1 for the flow of a heat transfer medium (hereinafter referred to as molten salt since this is the material used in the first preferred embodiment) are conduits 13, 15, 17, and 19, and to a circumference of the second reaction chamber 3 for the flow of molten salt are conduits 21, 23, 25, and 27. In the first preferred embodiment of the present invention, the conduits 13, 15, 17, 19, 21, 23, 25, and 27 are ring-shaped to correspond to the cylindrical outer shape of the shells $1a$ and $3a$ respectively of the first and second reaction chambers 1 and 3, and are structured to either supply molten salt flowing therein into the first and second reaction chambers 1 and 3 or to discharge the molten salt from within the first and second reaction chambers 1 and 3.

The molten salt flows into or out of the conduits 13, 15, 17, 19, 21, 23, 25, and 27 from or to heat exchange units 29 and 31, which are mounted external to the first and second reaction chambers 1 and 3. To realize this operation, the conduits 15, 17, 23, and 25 respectively include entrance openings $15a$, $17a$, $23a$, and $25a$, while the conduits 13, 19, 21, and 27 respectively include exit openings $13a$, $19a$, $21a$, and $27a$.

As shown in the drawings, the conduits 13, 15, 17, 19, 21, 23, 25, and 27 are provided in pairs that correspond to the spaces $1d$, $1e$, $3d$, and $3e$ of the first and second reaction chambers 1 and 3. The conduits 15, 17, 23, and 25 respectively including the entrance openings $15a$, $17a$, $23a$, and $25a$ are positioned closer to the shield plates 11 than the conduits 13, 19, 21, and 27 respectively including the exit openings $13a$, $19a$, $21a$, and $27a$.

The heat exchange units 29 and 31 perform heat transfer operation by using the molten salt. That is, the heat exchange units 29 and 31 either increase or decrease the temperature of the molten salt depending on a location of the contact tubes 5 along the axis Z direction of the first and second reaction chambers 1 and 3. In the first embodiment of the present invention, the heat exchange units 29 and 31 respectively include heat exchangers $29a$ and $31a$ (i.e., a single heat exchanger each) that perform a heat exchange operation with the molten salt in the spaces $1d$, $1e$, $3d$, and $3e$ of the first and second reaction chambers 1 and 3.

Reference numerals I, II, III, and IV in FIG. 2 indicate the catalyst or the inert particle layers classified according to oxidation reaction steps taking place in the reactors. For convenience, layer I is referred to as an inert particle layer A, layer II is referred to as a first stage layer A, layer III is referred to as a first stage layer B, and layer IV is referred to as an inert particle layer B. Since the accumulation of heat is most severe in the vicinity of overheating spots or hot spots in layer II, it is necessary that the molten salt that will be circulated through layer II has the lowest catalyst activation temperature. Also, since it is necessary that an oxidation reaction vigorously occurs in layer III, the molten salt must be circulated through layer III at a higher temperature than when circulated through layer II. The different, relative temperatures of the molten salt according to the layer were obtained from the results of repeated experiments. In particular, it is preferable that the temperature difference in the molten salt between layer II and layer III is 0~50° C., and more preferably 5~20° C.

The heat exchange units 29 and 31 will now be described in detail. In the preferred embodiment of the present invention, the heat exchange units 29 and 31 each include a single heat exchanger as described above, that is, the heat exchangers $29a$ and $31a$, respectively. However the structures of these heat exchanging units need not be limited to any particular configuration if each heat exchanging unit is organized so that the temperature of the molten salt circulating each chamber can be properly controlled with one heat exchanger per chamber.

That is, in the first embodiment of the present invention, heat exchange units 29 and 31 are realized through two different configurations. First, the heat exchanger $29a$ of the heat exchange unit 29 corresponding to the first reaction chamber 1 is connected to the exit opening $13a$ of the conduit 13, which is mounted corresponding to the location of the space $1d$ of the first reaction chamber 1. Further, the heat exchange unit 29 includes a first holder $29c$ to which a steam line $29b$ is connected. The first holder $29c$ is connected to the entrance opening $15a$ of the conduit 15, which is mounted corresponding to the location of the space $1d$ of the first reaction chamber 1, and to the exit opening $19a$ of the conduit 19, which is mounted corresponding to the location of the space $1e$ of the first reaction chamber 1.

The heat exchange unit 29 also includes a second holder $29d$ that is connected to the entrance opening $17a$ of the conduit 17, which is mounted corresponding to the location of the space $1e$ of the first reaction chamber 1, and to the heat exchanger $29a$. A regulating valve $29e$ is mounted between and connected to the first holder $29c$ and the second holder $29d$. The regulating valve $29e$ detects a temperature of the molten salt circulating through the space $1e$ of the first reaction chamber 1, and if needed operates such that a predetermined amount of molten salt stored in the first holder $29c$ is transmitted to the second holder $29d$.

The heat exchange unit 31, which operates in the second stage of the oxidation reaction, is structured to function differently from the heat exchange unit 29. The heat exchange unit 31 selectively realizes cooling of the molten salt with respect to the spaces 3d and 3e of the second reaction chamber 3. In more detail, the heat exchange unit 29 corresponding to the first reaction chamber 1 has a fixed structure where the molten salt with respect to the space 1d is circulated at a higher temperature than the molten salt in the space 1e. On the other hand, the heat exchange unit 31 has more flexible heat controlling structure. That is, the heat exchange unit 31 corresponding to the second reaction chamber 3 is structured such that the temperatures of the molten salt in the spaces 3d and 3e may be selectively controlled if needed.

The heat exchange unit 31 includes the single heat exchanger 31a, as well as third and fourth holders 31d and 31e to which are connected steam lines 31b and 31c, respectively. The third holder 31d is connected to the entrance opening 23a of the conduit 23, which is mounted corresponding to the location of the space 3d of the second reaction chamber 3, and the fourth holder 31e is connected to the entrance opening 25a of the conduit 25, which is mounted corresponding to the location of the space 3e of the second reaction chamber 3.

The heat exchange unit 31 also includes first and second 4-way valves 31f and 31g. The first 4-way valve 31f is connected to the exit opening 27a of the conduit 27, which is mounted corresponding to the location of the space 3e of the second reaction chamber 3, and to the exit opening 21a of the conduit 21, which is mounted corresponding to the location of the space 3d of the second reaction chamber 3. On the other hand, the second 4-way valve 31g is connected to the heat exchanger 31a and the fourth holder 31e as well as to the first 4-way valve 31f. In addition, the heat exchange unit 31 includes a regulating valve 31h mounted between the third holder 31d and the fourth holder 31e. The regulating valve 31h detects a temperature of the molten salt circulating through the space 3d of the second reaction chamber 3, and if needed operates such that a predetermined amount of molten salt stored in the fourth holder 31e is transmitted to the third holder 31d.

In FIG. 1, reference numeral 33 indicates a mixer that mixes molecular oxygen, steam, inert gas, etc. supplied from separate entrances; reference numeral 35 indicates a mixer that mixes propylene, which is the main reactant, and a mixture supplied from the mixer 33; and reference numeral 37 indicates a mixer that mixes a reactant produced after the first oxidation reaction in the first reaction chamber 1, a mixed gas that includes molecular oxygen, steam, etc.

With the heat exchange-type reactor of the first embodiment of the present invention structured as described above, the cooling of the molten salt is realized as follows during the production of acrylic acid, which occurs by propylene passing and reacting through the first and second reaction chambers 1 and 3 by the operation of the heat exchange units 29 and 31 as will be described below.

In the following, since the overall processes involved in the production of acrylic acid by a catalytic oxidation reaction are well known, the following will mainly explain the operation of the heat exchange units 29 and 31 of the first preferred embodiment of the present invention.

First, a main reactant is supplied to the first reaction chamber 1 through the mixer 35, and undergoes an oxidation reaction with the other reactants mentioned above in the first reaction chamber 1. During the course of the reaction the molten salt is supplied to the space 1d of the first reaction chamber 1 from the first holder 29c to circulate through the space 1d. Next, the molten salt exits the space 1d to be transmitted to the heat exchanger 29a.

The molten salt transmitted to the heat exchanger 29a generates steam while passing through the heat exchanger 29a. Accordingly, the temperature of the molten salt is lowered, and this cooled molten salt is supplied to the space 1e, which requires a lower cooling temperature distribution than the space 1d. This molten salt is circulated within the first reaction chamber 1 and then transmitted to the first holder 29c. During this process, the molten salt starting toward the space 1d from the second holder 29d receives a small amount of the molten salt in the first holder 29c by the operation of the regulating valve 29e depending on the temperature distribution in the space 1d, such that the temperature of the molten salt directed toward the space 1d is adjusted to a suitable level.

Through these processes, even if the heat exchange unit 29 has only the single heat exchanger 29a, the temperature distribution of the molten salt with respect to the space within the first reaction chamber 1, which requires differential temperature controlling, can be efficiently varied for supply to the first reaction chamber 1.

Acrolein produced after undergoing the first stage catalytic oxidation reaction through the first reaction chamber 1 and the heat exchange unit 29 is then supplied to the second reaction chamber 3 to realize a final production of acrylic acid by the catalytic oxidation reaction in the second reaction chamber 3. At this time, the molten salt circulated in the second reaction chamber 3 undergoes heat exchange through the heat exchange unit 31 as follows.

It is necessary that molten salt circulated through the space 3d of the second reaction chamber 3 has a lower temperature than molten salt circulated through the space 3e. Accordingly, molten salt supplied to the space 3e from the fourth holder 31e is maintained at a fixed temperature by the influence of the steam line 31c mounted to the fourth holder 31e while circulating through the space 3d. Subsequently, the molten salt is supplied to the heat exchanger 31a via the first 4-way valve 31f. At this stage, the molten salt generates steam by the heat exchanger 31a to thereby result in a reduction of its temperature.

This cooled molten salt is then transmitted to the third holder 31d through the second 4-way valve 31g, then to the space 3d to circulate therein. At this time, the molten salt in the fourth holder 31e is supplied to the third holder 31d as needed by operation of the regulating valve 31h such that molten salt of an optimal temperature distribution is circulated in the space 3d.

Therefore, even if the heat exchange unit 31 has only the single heat exchanger 31a, the temperature of the molten salt may be reduced in accordance with the space of the second reaction chamber 3 that is divided into upper and lower portions. If needed, the heat exchange unit 31 may effectively control the temperature of the molten salt even in the case where the temperature distributions of the molten salt circulated through the spaces 3d and 3e are varying.

In particular, if the temperature of the molten salt circulating through the space 3e must be reduced below the temperature of the molten salt circulating through the space 3d, the heat exchange unit 31 operates as follows.

Figure 4:
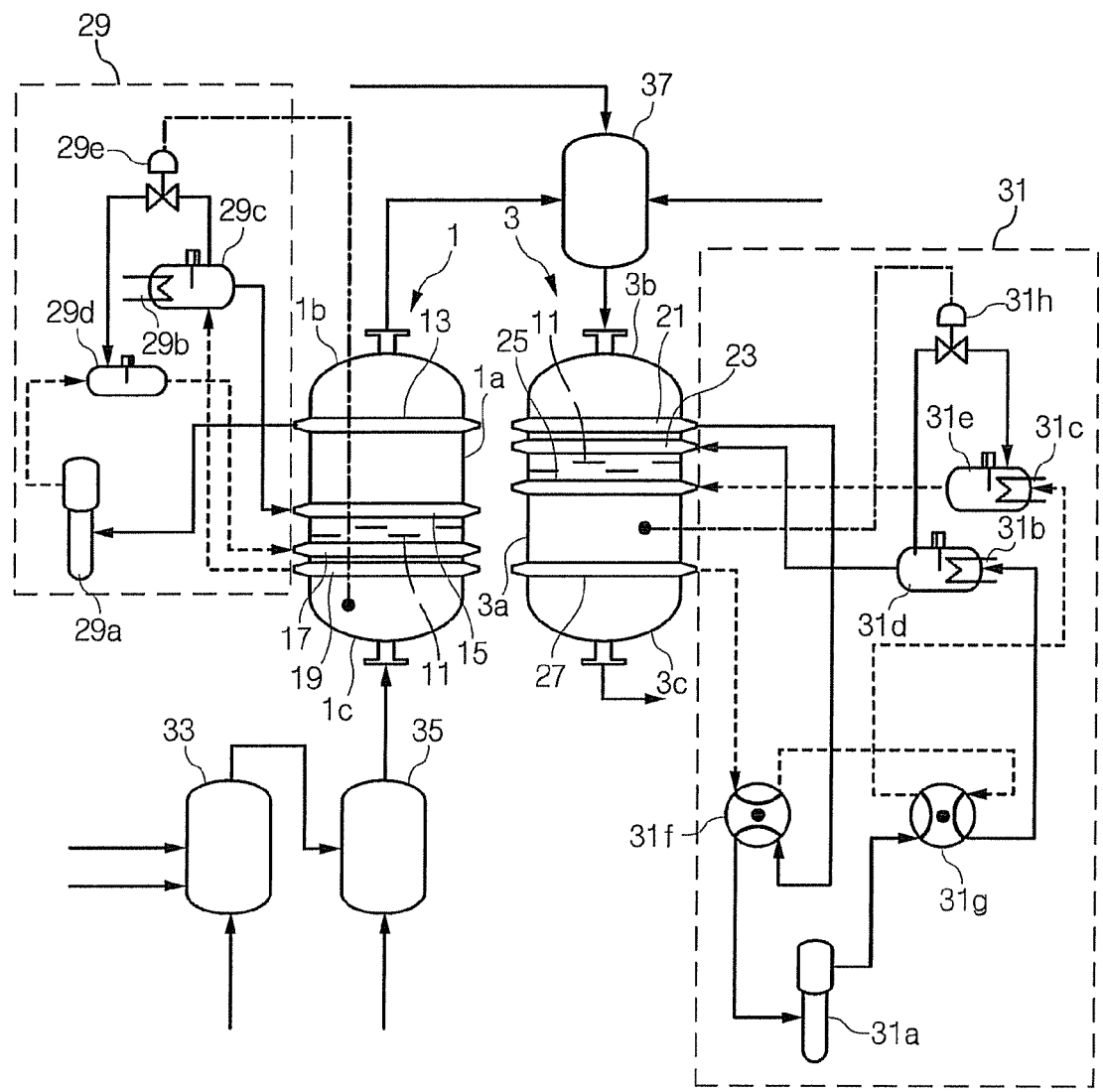
FIG. 4 is a drawing used to describe an operation of a heat exchange unit of the catalytic oxidation reactor of FIG. 1.

Referring to FIG. 4, the molten salt in the third holder 31d heated by the steam line 31b is supplied to the space 3d of the second reaction chamber 3 to be circulated therein. Next, the molten salt enters the heat exchange unit 31a through the first 4-way valve 31f. Further, the molten salt passed through the heat exchanger 31a generates steam therein such that its temperature is reduced. The cooled molten salt passes through the second 4-way valve 31g for supply to the fourth holder 31e, after which the molten salt enters the space 3e of the second reaction chamber 3 for circulation therein.

In the case where the temperature of the molten salt supplied to the space of the second reaction chamber 3 must be varied, the pathways that the molten salt travels may be altered by the operation of the first and second 4-way valves 31f and 31g. As a result, the molten salt may be made to efficiently match the oxidation reaction conditions and is supplied to the second reaction chamber 3. The implementation of the heat exchange unit 31, however, is not limited to the second reaction chamber. If necessary, the same or the similar type of the heat exchange unit 31 can be installed for the first reaction chamber.

Figure 5:
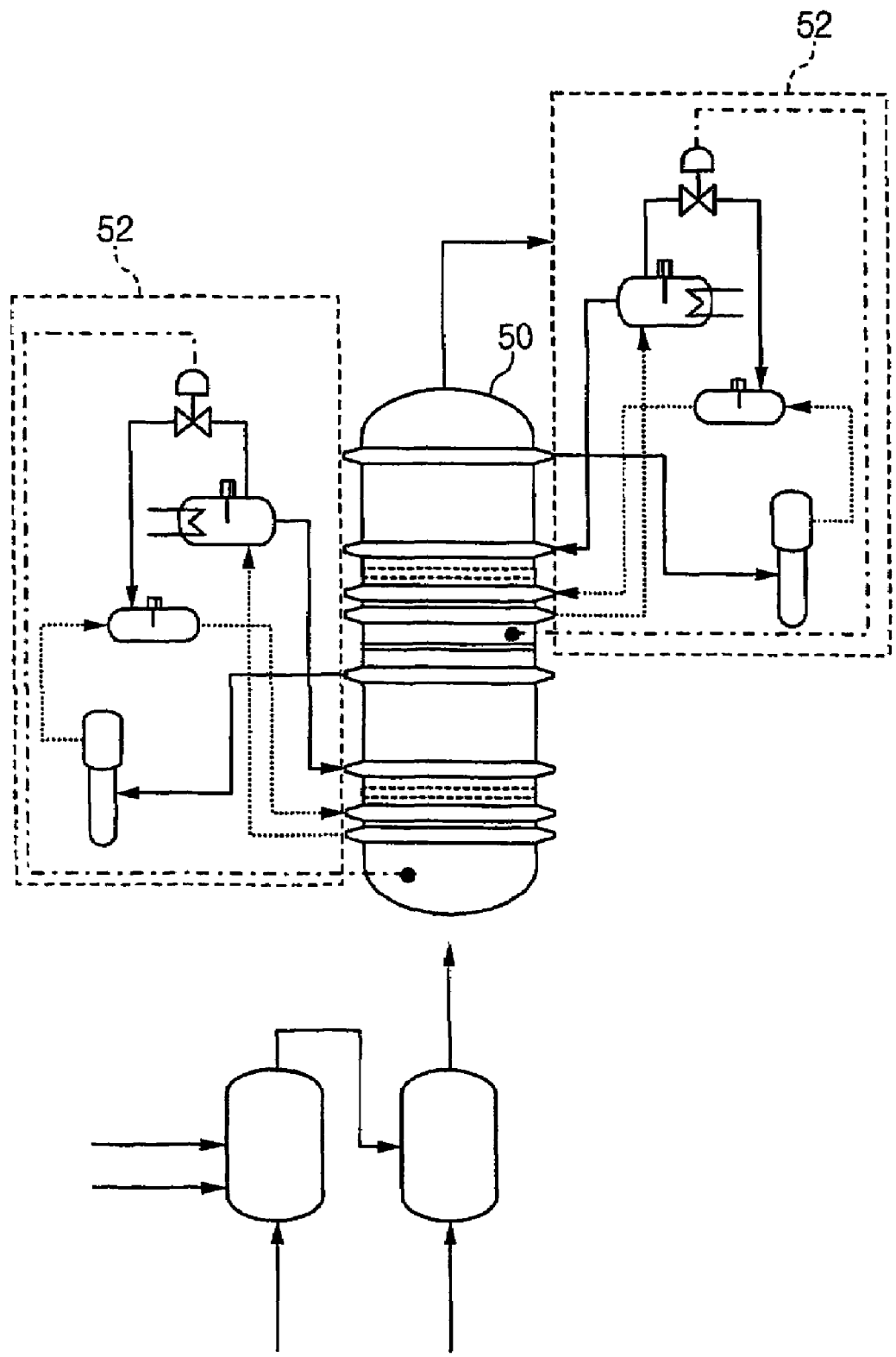
FIG. 5 is a typical view of a catalytic oxidation reactor according to a second embodiment of the present invention.

FIG. 5 is a typical view of a catalytic oxidation reactor according to a second embodiment of the present invention. As shown in the drawing, the oxidation reactor according to the second embodiment of the present invention provides a single reaction chamber 50 to produce acrylic acid from propylene. That is, in the reaction chamber 50 both first and second stage oxidation reactions occur. Heat exchange units 52 are mounted to the reaction chamber 50, and the reactor includes all the structural elements in the reaction chamber 50 as are provided in the first and second reaction chambers of the first preferred embodiment of the present invention.

The heat exchange units 52 have the structure of the heat exchange unit connected to the first reaction chamber of the first embodiment. However, if needed, the heat exchange units 52 may be structured similarly to the heat exchange unit connected to the second reaction chamber of the first embodiment.

The operation of the reactor according to the second embodiment of the present invention is substantially identical to that of the first embodiment. A detailed description of its operation will therefore not be provided.

In the oxidation reactor of the present invention structured and operating as described above, the configurations of the heat exchange units that operate to cool molten salt are simplified. Also, the cooling of the molten salt is effectively realized such that hot spots with respect to the catalyst layer and runaway are minimized to greatly improve manufacturing productivity.

In addition, the oxidation reactor of the present invention decreases the number of heat exchangers for the heat exchange units corresponding to the reaction chamber, which has its inner space divided, such that overall manufacturing costs are reduced. Also, the oxidation reactor may cope with the situation in which the temperature distribution of the cooling layer within the reactor must be reversed without experiencing shutdown.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A heat exchange-type reactor, comprising:
a reaction chamber comprising a plurality of contact tubes filled with catalyst materials mounted therein; and at least one shield plate to partition an inner space of the reaction chamber into at least two separate spacers;
a first holder connected to the reaction chamber, the first holder that directly supplies a first heat transfer medium to the reaction chamber and directly receives a second heat transfer medium supplied from the reaction chamber;
a heat exchange unit connected to the reaction chamber, the heat exchange unit that receives the heat transfer medium from the reaction chamber and perform heat exchange of the first heat transfer medium;
a second holder connected to the heat exchanger and the reaction chamber, the second holder that receives the second heat transfer medium from the heat exchange unit and directly supplies the second heat transfer medium to the reaction chamber; and
a regulating valve connected between the first holder and the second holder, the regulating valve regulating a flow rate of the second heat transfer medium received in the second holder;
a mixer in which a mixture together with a reactant generated during passing of the reaction chamber, a mixed gas containing oxygen, and a steam is manufactured;
another reaction chamber connected to the mixer, the other reaction chamber that receives the mixture form the mixer;
a third holder connected to the other reaction chamber and provided with a steam line to heat a third heat transfer medium, the third holder directly supplies the third heat transfer medium to the other reaction chamber;
a first 4-way valve connected to the other reaction chamber, the first 4-way valve that directly receives a fourth heat transfer medium from the other reaction chamber;
a second 4-way valve connected to the first 4-way valve, the second 4-way valve that receives the third heat transfer medium from the first 4-way valve;
a fourth holder connected to the second 4-way valve, the fourth holder that receives the third heat transfer medium from the second 4-way valve, is provided with another steam line to heat the third heat transfer medium, and directly supplied the fourth heat transfer medium to the other reaction chamber;
another heat exchange unit connected between the first and second 4-way valves, the other heat exchange unit that receives the fourth heat transfer medium from the first 4-way valve, perform heat exchange of the fourth heat transfer medium, and supplies the fourth heat transfer medium to the second 4-way valve; and
another regulating valve connected between the third holder and the fourth holder, the regulating valve regulating a flow rate of the third heat transfer medium received in the fourth holder; and
wherein the first 4-way valve receives the third heat transfer medium from the other reaction chamber and the second 4-way valve supplies the fourth heat transfer medium to the third holder.

2. The reactor of claim 1, wherein the first and second heat transfer mediums are selected from the group consisting of molten salts, silicone oils, DOWTHERMs and steam.

* * * * *